United States Patent [19]

Harvey

[11] Patent Number: 5,762,783
[45] Date of Patent: Jun. 9, 1998

[54] FILTER FLUSHING ARRANGEMENT

[75] Inventor: Keith F. Harvey, Peoria, Ill.

[73] Assignee: Caterpillar Inc., Peoria, Ill.

[21] Appl. No.: 717,787

[22] Filed: Sep. 23, 1996

[51] Int. Cl.$^6$ .............................. B01D 35/12; B01D 29/66
[52] U.S. Cl. .................... 210/108; 184/6.24; 210/171; 210/333.01; 210/425
[58] Field of Search ................ 210/108, 168, 210/171, 299, 333.01, 333.1, 335, 340, 341, 411, 425–427, 791; 184/6.24, 90, 167, 295; 55/283, 315, 351, 302

[56] References Cited

U.S. PATENT DOCUMENTS

| | | | |
|---|---|---|---|
| 2,354,645 | 8/1944 | Bateman | 210/299 |
| 4,469,594 | 9/1984 | Poetter | 210/108 |
| 4,636,306 | 1/1987 | Radmall | 210/108 |
| 5,499,693 | 3/1996 | Widenhorn | 210/108 |

FOREIGN PATENT DOCUMENTS 0 519 801   12/1992   European Pat. Off. .

OTHER PUBLICATIONS

"Moatti Automatic Filters For Lubricating Oils Clean & Simple", specification sheet, Alfa–Laval Marine & Power, Warminster, Pa, Undated.

"Moatti Automatic Lube–Oil Filters For Trunk–Piston Diesel Engines", specification sheet, Alfa–Laval Marine & Power, Warminster, Pa, Undated.

*Primary Examiner*—Joseph W. Drodge
*Attorney, Agent, or Firm*—J. W. Burrows

[57] ABSTRACT

A filter flushing arrangement is provided and includes a first filtering device, a second filtering device, and a valve arrangement connected to the first and second filtering devices. The valve arrangement is operative to change the direction of fluid flow through the first filtering device upon a filter element therein becoming clogged to flush the particles to the second filtering device which collects the particles on a filtering element therein and subsequently allows the foreign particles to freely settle to a collection basin. Some form of vibration and/or a burst of fluid from a fluid accumulating mechanism may be used to free the particles therefrom and allow them to settle to the collection basin. The collection basin is capable of collecting the particles over a long period of operation of the fluid system.

7 Claims, 3 Drawing Sheets

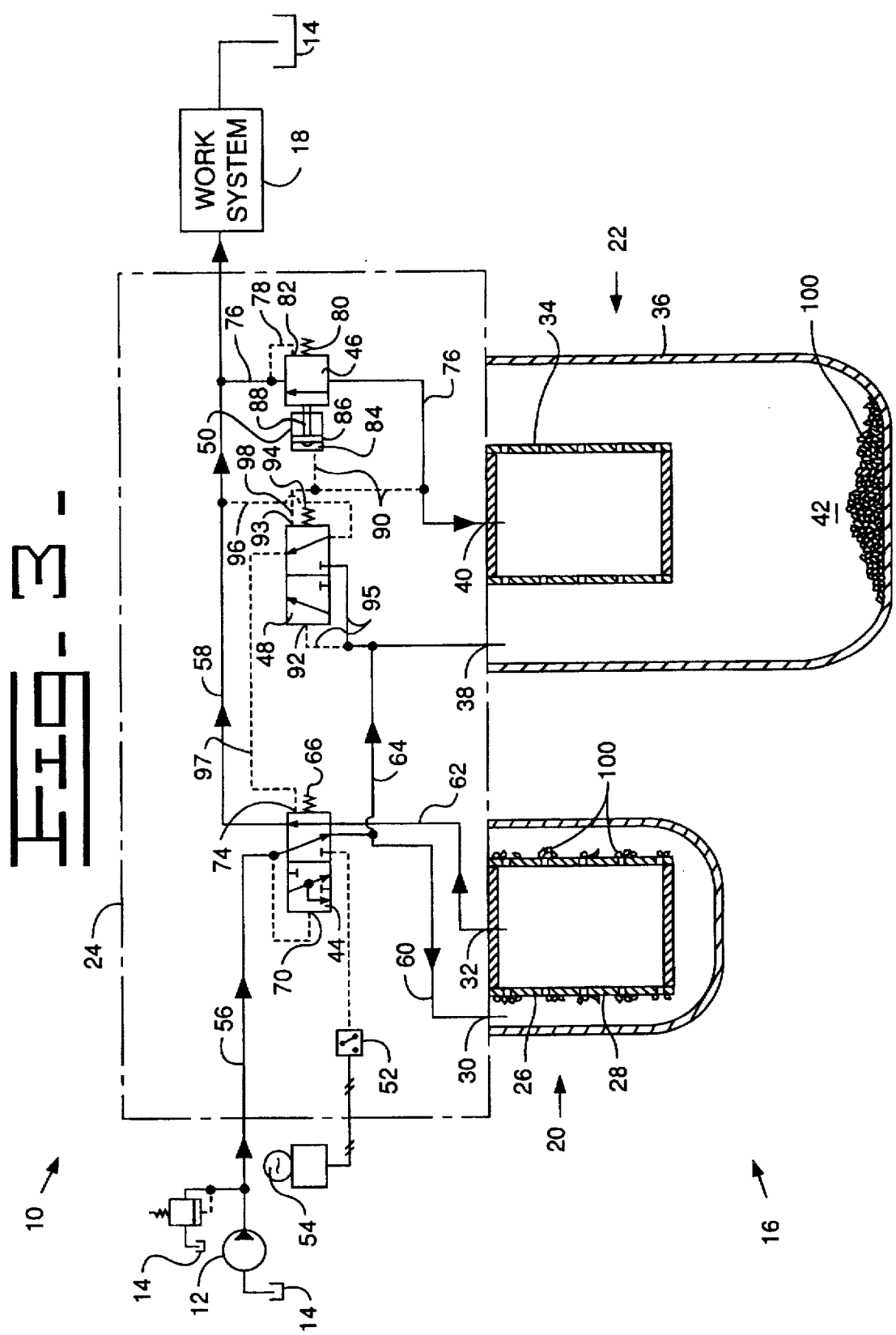

FILTER FLUSHING ARRANGEMENT

TECHNICAL FIELD

The subject invention relates to a filter arrangement and more particularly to an arrangement for flushing foreign particles from the filter arrangement.

BACKGROUND ART

Most filters used in machines today require changing the filtering element on a timely basis or more frequently in the event of component failure within the fluid system. Normally the filtering element is disposed of and a new filtering element installed. In other arrangements, the filtering element is removed, cleaned and re-installed. In some arrangements, it has been known to backflush a filter element with a source of compressed air that is electrically controlled. Additionally, it has been known to backflush a filter arrangement by providing a mechanism having numerous independent filtering chambers that are intermittently backflushed in response to the various independent filtering chambers being rotated into position to be exposed to the fluid being filtered. This arrangement is complicated in design and generally bulky in size. It is desirable to have a simple filter arrangement that is applicable to hydraulic systems in machines, such as, construction equipment that is capable of filtering fluids having very small particle sizes without routine maintenance for an extended period of time.

The present invention is directed to overcoming one or more of the problems set forth above.

DISCLOSURE OF THE INVENTION

In one aspect of the present invention, a filter flushing arrangement is provided and adapted for use in a fluid system having a source of pressurized fluid and a work system. The filter flushing arrangement comprises a first filtering device having a filtering element operative to filter the fluid flowing therethrough in a first direction and a second filtering device having a filtering element. A collection basin is provided in cooperation with the second filtering device to retain trapped foreign particles and a valve arrangement is connected to the first and second filtering devices. The valving arrangement is operative to automatically change the direction of fluid flow through the first filtering device in response to a change in the resistance of fluid flow therethrough in the first direction and to cause the fluid flowing in the opposite direction from the first filtering device to flow through the second filtering device in a first direction.

BRIEF DESCRIPTION OF THE DRAWINGS

FIG. 3 is a partial schematic and a partial diagrammatic representation of the filter flushing arrangement at the completion of flushing.

BEST MODE FOR CARRYING OUT THE INVENTION

Figure 1:
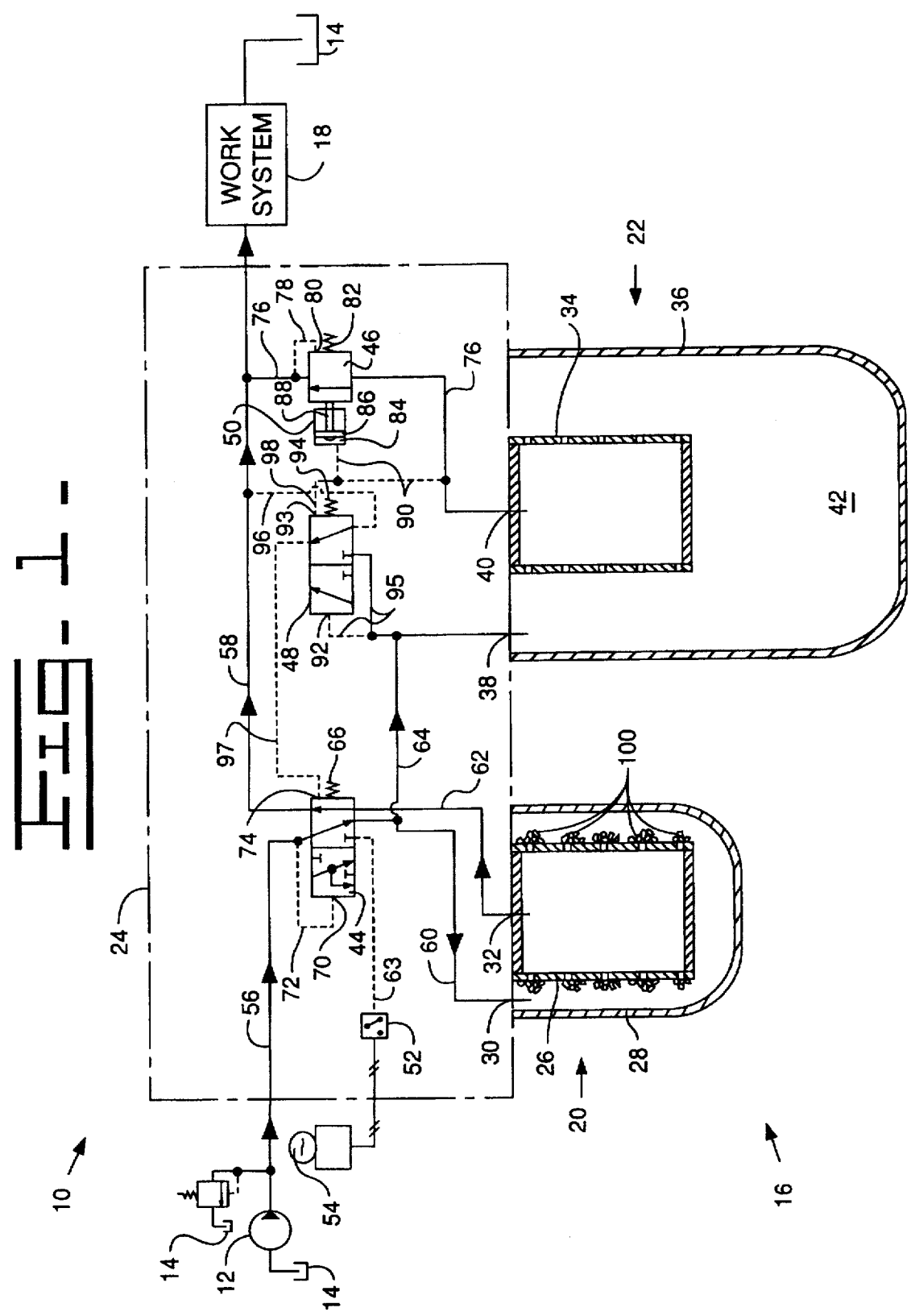
FIG. 1 is a partial schematic and a partial diagrammatic representation of a filter flushing arrangement incorporating an embodiment of the subject arrangement.

Referring to the drawings and more particularly to FIG. 1, a fluid system 10 is illustrated and includes a source of pressurized fluid 12 which receives fluid from a reservoir 14, a filter flushing arrangement 16, and a work system 18. Even though the filter flushing arrangement 16 is shown as being between the source of pressurized fluid 12 and the work system 18, it is recognized that the filter flushing arrangement 16 could be located between the work system 18 and the reservoir 14 without departing from the essence of the subject invention.

The filter flushing arrangement 16 includes a first filtering device 20, a second filtering device 22 and a valve arrangement 24. The first filtering device 20 includes a filtering element 26 maintained in a housing 28. A first port 30 is provided in the first filtering device 20 to communicate fluid to or from the outer surface of the filtering element 26 and a second port 32 is provided to communicate fluid to or from the other side of the filtering element 26. A first direction of fluid flow is established when fluid flows into the first port 30 across the filtering element 26 and out the second port 32.

The second filtering device 22 includes a filtering element 34 maintained in a housing 36. A first port 38 is provided in the second filtering device 22 to communicate fluid to the outer surface of the filtering element 34 and a second port 40 is provided to communicate fluid to the other side of the filtering element 34. A first direction of fluid flow is established when fluid flows into the first port 38 across the filtering element 34 and out the second port 40. A collection basin 42 is defined at the bottom of the housing 36 between the bottom of the filtering element 34 and the bottom of the housing 36.

The valving arrangement 24 includes a first valving mechanism 44, a second valving mechanism 46, a third valving mechanism 48, a fluid accumulating mechanism 50 operative to store a volume of fluid, and a pressure switch 52 operatively connected to an illuminating device 54. A predetermined level of pressurized fluid directed to the pressure switch 52 activates the pressure switch 52 to light the illuminating device 54.

The first valving mechanism 44 is connected to the source of pressurized fluid 12 by a conduit 56 and to the work system 18 by a conduit 58. A conduit 60 connects the first valving mechanism 44 to the first port 30 of the first filtering device 20 and a conduit 62 connects the second port 32 thereof to the first valving mechanism 44. A conduit 63 is connected between the first valving mechanism 44 and the pressure switch 52. A conduit 64 and the conduit 60 connects the first port 30 of the first filtering device 20 to the first port 38 of the second filtering device 22.

The first valving mechanism 44 is a two position valve that is spring biased to a first position by a spring 66. A first pressure chamber 70 is located at the end thereof opposite the spring 66 and connected to the conduit 56 by a pilot conduit 72. A second pressure chamber 74 is disposed at the end thereof adjacent the spring 66. At the first position of the first valving mechanism 44, the source of pressurized fluid 12 is in communication with the first port 30 of the first filtering device 20 and the second port 32 thereof is in communication with the work system 18. In the second position thereof, the source of pressurized fluid 12 is in communication with the second port 32 of the first filtering device 20, the first port 30 is blocked from communication with the work system 18 across the first valving mechanism 44, and the source of pressurized fluid 12 is in communication with the pressure switch 52.

A conduit 76 is connected between the second port 40 of the second filtering device 22 and the work system 18 and has the second valving mechanism 46 disposed therein. A pilot conduit 78 connects the conduit 76 downstream of the second valving mechanism 46 with a pressure chamber 80 located on one end thereof. A spring 82 is disposed on the one end thereof adjacent the pressure chamber 80 and acts in cooperation with the pressure in the pressure chamber 80 to bias the second valving mechanism to a first position.

The accumulating mechanism 50 is operatively connected to the second valving mechanism 46 on the other end thereof and operative to selectively move the second valving mechanism 46 to a second position against the combined bias of the spring 82 and pressure acting in the pressure chamber 80 thereof. The fluid accumulating mechanism 50 has a fluid volume chamber 84, a piston 86 disposed in the fluid chamber 84, and a rod 88 connected between the piston 86 and the second valving mechanism 46. A pilot conduit 90 and a portion of the conduit 76 connects the second port 40 of the second filtering device 22 with the fluid volume chamber 84.

The third valving mechanism 48 is operatively connected between the work system 18, the first port 38 of the second filtering device 22 and the second pressure chamber 74 of the first valving mechanism 44. A first pressure chamber 92 is located on one end of the third valving mechanism 48 and a second pressure chamber 93 and a spring 94 is disposed on the other end thereof. A conduit 95 and a portion of the conduit 64 connects the first port 38 of the second filtering device 22 with the third valving mechanism 48 and the first pressure chamber 92 thereof. A conduit 96 connects the work system 18 with the third valving mechanism 48 and a conduit 97 connects the third valving mechanism 48 with the second pressure chamber 74 of the first valving mechanism 44. A pilot conduit 98 and portions of the conduits 90,76 connect the second port 40 of the second filtering device 22 with the second pressure chamber 93 of the third valving mechanism 48.

As illustrated, during normal operation with fluid flowing in the first direction, foreign particles 100 connect on the outer surface of the filtering element 26 of the first filtering device 20.

Figure 2:
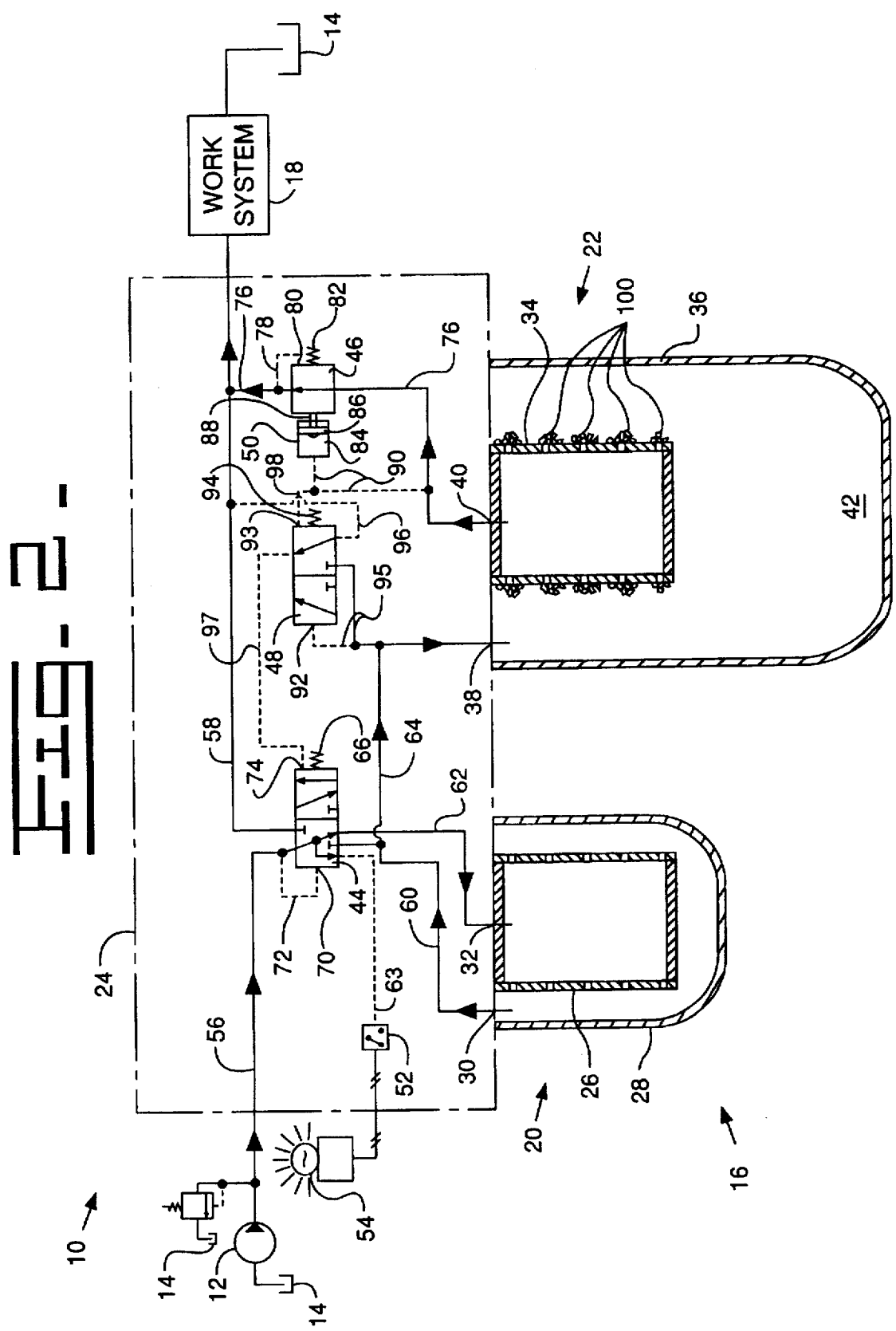
FIG. 2 is a partial schematic and a partial diagrammatic representation of the filter flushing arrangement of FIG. 1 illustrating the arrangement during flushing.

Referring to FIG. 2, the filter flushing arrangement 16 is shown during the flushing mode of operation. Like elements have like element numbers. In the valve arrangement 24 of FIG. 2, the first valving mechanism 44 is shown in its second position which forces fluid to flow through the first filtering device 20 in the second direction and the illuminating device 54 is energized. Likewise, the second valving mechanism 46 is moved to its second position to connect the second port 40 of the second filtering device 22 with the work system 18. As illustrated, the foreign particles 100 have been flushed from the outer surface of the first filtering element 26 and deposited on the outer surface of the second filtering element 34.

Referring to FIG. 3, the filter flushing arrangement 16 is shown subsequent to the flushing mode. Like elements have like element numbers. In the valve arrangement 24 of FIG. 3, the first valving mechanism 44 has returned to its first position and the second valving mechanism 46 has returned to its first position. The "burst" or quick rush of fluid from the accumulating mechanism 50 has flushed the foreign particles 100 from the outer surface of the filtering element 34 allowing them to settle into the collection basin 42.

It is recognized that various forms of the subject filter flushing arrangement 16 could be utilized without departing from the essence of the subject invention. For example, the respective filtering elements 26,34 could be screens having various mesh sizes, well known papers, or other porous materials having controlled sized openings defined therein. The respective filtering elements 26,34 could be a shape other than cylindrical, for example, the filter element shape could be conical or a truncated cone. Many other shapes could be used without departing from the essence of the invention. Even though the first filtering element 26 is shown as being larger than the second filtering element 34, it is recognized that they could be the same size. In fact, the first filtering element 26 could be smaller than the second filtering element 34 as long as the filtering capacity of the first filtering element 26 is equal to or larger than the filtering capacity of the second filtering element 34. However, it has been found that the second filtering element 34 should be a little smaller for best results. Likewise, the pressure switch 52 could be responsive to the pressure differential across the first filtering element 26 in the first flow direction. Furthermore, the collection basin 42 could have baffles or the like between the basin and the filter element or it could even be a separate element connected to the housing 36 through an opening at the bottom thereof. It is also recognized that the valves mechanisms within the valving arrangement 24 could be rotary valves or electrically controlled by solenoid operated valves or the like. Additionally, the normal flow of fluid could be reversed to make the filtering an inside/out filter verses an outside/in type of filter.

INDUSTRIAL APPLICABILITY

During normal operation of the fluid system 10, as illustrated in FIG. 1, fluid from the source of pressurized fluid 12 flows in the first direction through the conduit 56, across the first valving mechanism 44, through the filtering element 26 of the first filtering device 22, and back across the first valving mechanism 44 to the work system 18. Even though the fluid in conduit 60,64 is also connected to the first port 38 of the second filtering device 22, the flow of fluid will not flow therethrough. Since the flow of fluid always takes the path of least resistance and the path through the second filtering device 22 across the second valving mechanism 46 is blocked and requires a predetermined pressure in the accumulating mechanism 50 to move the second valving mechanism to its second position, the flow continues across the first valving mechanism 44 to the work system 18.

As the fluid system 10 continues to function, foreign particles 100 collect on the outer surface of the filtering element 26. As more foreign particles 100 collect on the outer surface thereof the resistance to fluid flow thereacross increases. Consequently, the pressure difference between the first and second ports 30,32 thereof increases. Since the pressure in the first port 30 is in communication with the first pressure chamber 70 of the first valving mechanism 44 through conduits 60,56,72 and the pressure in the second port 32 thereof is in communication with the second pressure chamber 74 through the conduits 62,58,96,97, the differential pressure thereacross is effective to control movement of the first valving mechanism 44 against the bias of the spring 66.

Once the pressure differential reaches a predetermined level, as shown in FIG. 2, the first valve mechanism 44 moves to its second position causing the fluid to flow through the first filtering device 20 in the second direction. At the same time, the pressurized fluid from the source 12 is connected to the pressure switch 52 moving it to a position to light the illuminating device 54. Since the flow from the first port 30 is blocked from flowing across the first valving mechanism 44 to the work system 18, the fluid is forced to flow through the conduit 64 and across the second filtering device 22. In view of the fact that the second valving mechanism 46 is closed, the pressure of the fluid in the conduit 76 from the second port 40 increases. The pressurized fluid therein is directed to the fluid chamber 84 of the accumulating mechanism 50 filling the fluid chamber 84 and moving the piston 86 against the rod 88 to move the second valving mechanism 46 to its second position.

The fluid flow from the first port 30 of the first filtering device 20 quickly dislodges and carries the foreign particles 100 from the outer surface of the filtering element 26 to the outer surface of the filtering element 34. Since the pressure of the fluid in the conduit 58 remains low, the first valving mechanism 44 remains in its second position. During the flushing mode, the pressurized fluid in the conduit 76 upstream of the second valving mechanism 46, as sensed through the conduit 98, holds the third valving mechanism 48 in its first position. The foreign particles 100 from the first filtering device 20 quickly covers the outer surface of the filtering element 34 thus increasing the resistance to fluid flow thereacross in the first direction. The pressure upstream of the filtering element 34 is directed to the first pressure chamber 92 and the pressure downstream thereof is connected to the second pressure chamber 93. Once the differential pressure acting across the second filtering device 22 reaches a predetermined level, the third valving mechanism 48 moves to its second position. The pressurized fluid in the conduit 64 is directed to the second pressure chamber 74 of the first valving mechanism 44 forcing it back to its first position. Once the first valving mechanism 44 moves to its first position, the pressure in the conduit 64 quickly reduces to allow the third valving mechanism 48 to move back to its first position by the combined forces of the spring 94 and the force of the pressurized fluid in the conduits 76,90,98 acting in the pressure chamber 93.

Simultaneously therewith, the volume of fluid in the fluid chamber 84 of the accumulating mechanism 50 is forced out by the movement the piston 86. The piston 86 is moved by the combined forces of the spring 82 and the pressure of fluid in the pressure chamber 80 acting to move the second valving mechanism 46 back to its first position. The sudden rush or "burst" of fluid is directed to the second port 40 and across the filtering element 34 in the second direction to dislodge the foreign particles 100 from the outer surface thereof. It is recognized that many of the foreign particles 100 may settle to the collection basin 42 without the need for the "burst" of fluid. Likewise, normal vibrations or induced vibrations would cause foreign particles 100 to dislodge and settle to the collection basin 42. Once the particles are dislodged, the foreign particles 100 settle to the collection basin 42 where they remain until the housing 36 is removed and cleaned. The collection basin 42 is of a size sufficient to retain foreign particles 100 from many flushing cycles thus effectively increasing the time interval between servicing the filters in the fluid system 10.

Following the flushing of the first filtering device 20, the fluid system 10 operates in a normal manner with the fluid flowing through the first filtering device 20 in the first direction. Once the differential pressure across the filtering element 26 increases to the predetermined level, the first filtering device 20 is again flushed as set forth above.

The subject filter flushing arrangement 16 is capable of filtering any type of fluids having various sizes of foreign particles therein. Likewise, the filter flushing arrangement 16 can filter fluid in fluid systems having fluid flow volumes from a few gallons per minutes or less to fluid systems having a hundred or more gallons per minute. It is only necessary to ensure that the respective first and second filtering elements are of a size sufficient to allow the full volume of fluid to flow thereacross and that the paper, synthetic media or screen size of the filtering elements 26,34 is of the size to collect the smallest foreign particles desired. It is also recognized that more than one filter flushing arrangement 16 could be connected in parallel in order to handle a larger volume of fluid flow in the fluid system 10.

From a review of the above, it should be recognized that the filter flushing arrangement 16 effectively filters the fluid in the fluid system 10 and automatically flushes the foreign particles 100 from the first filtering device 20 and collects the foreign particles 100 in a collection basin 42 in a simple and effective manner in order to extend the change or cleaning intervals of the system filters.

Other aspects, objects and advantages of the invention can be obtained from a study of the drawings, the disclosure and the appended claims.

I claim:

1. A filter flushing arrangement operative to collect foreign particles and adapted for use in a fluid system having a source of pressurized fluid and a work system, the filter flushing arrangement comprising:

a first filtering device having a filtering element operative to filter fluid flowing therethrough in a first direction;

a second filtering device having a filtering element and a collection basin to retain trapped foreign particles; and a valve arrangement connected to the first and second filtering devices and operative to automatically change the direction of fluid flow through the first filtering device in response to a change in resistance of fluid flow therethrough in the first direction and to cause fluid to flow in an opposite direction through the first filtering device and then to flow through the second filtering device in a first direction wherein the valve arrangement includes a first valving mechanism that is spring biased to a first position to direct fluid flow from the source of pressurized fluid through the first filtering device in the first direction and on to the work system and movable to a second position in response to the change in the resistance of fluid flow therethrough to cause the fluid to flow in the opposite direction through the first filtering element to the second filtering element.

2. The filter flushing arrangement of claim 1 wherein the valve arrangement includes a fluid accumulating mechanism operative to selectively store a volume of pressurized fluid and a second valving mechanism connected between the second filtering device and the work system and the second valving mechanism being operative to control the fluid flow thereacross from the second filtering device in response to the pressurized fluid in the fluid accumulating mechanism.

3. The filter flushing arrangement of claim 2 wherein the first valving mechanism has a first pressure chamber at one end, a spring and a second pressure chamber at the other end, the first pressure chamber being connected to the source of pressurized fluid upstream of the first valving mechanism, and the valve arrangement includes a third valving mechanism selectively connected between one of the work system and the connection intermediate the first and second filtering devices and the second pressure chamber of the first valving mechanism.

4. The filter flushing arrangement of claim 3 wherein the third valving mechanism is a two position valve biased to a first position at which the pressurized fluid in the work system is in communication with the second pressure chamber of the first valving mechanism and movable to a second position at which the pressurized fluid between the first and second filtering devices is in communication with the second pressure chamber of the first valving mechanism, and the third valving mechanism is movable from its first position to its second position in response to resistance of fluid flow through the second filtering device in the first direction.

5. The filter flushing arrangement of claim 4 wherein the third valving mechanism has a first pressure chamber at one end thereof connected to the intermediate connection between the first and second filtering devices and a spring and a second pressure chamber at the other end thereof connected to the second valving mechanism upstream thereof, and the third valving mechanism is biased to its first position responsive to the combined force of the spring and pressurized fluid upstream of the second valving mechanism being directed to the second pressure chamber thereof and biased to its second position responsive to pressurized fluid between the first and second filtering devices being directed to the first pressure chamber thereof.

6. The filter flushing arrangement of claim 5 wherein the fluid accumulating mechanism has a fluid volume chamber and a piston connected to the second valving mechanism and operative to move the second valving mechanism to a position which communicates the second filtering device with the work system in response to the fluid accumulating mechanism retaining a predetermined volume of fluid at a predetermined pressure level.

7. The filter flushing arrangement of claim 6 wherein upon movement of the third valving mechanism to its second position and subsequently back to its first position, and the volume of fluid collected in the fluid accumulating mechanism is quickly expelled from the fluid volume chamber thereof through the second filtering device in a second direction to free any particles held against the second filtering device thus allowing the particles to settle in the collection basin.

* * * * *